(12) United States Patent
Semerad

(10) Patent No.: US 11,132,418 B2
(45) Date of Patent: Sep. 28, 2021

(54) SYSTEMS AND METHODS FOR GENERATING FLOATING BUTTON INTERFACES ON A WEB BROWSER

(71) Applicant: Kindest, Inc., Santa Monica, CA (US)

(72) Inventor: David Semerad, Santa Monica, CA (US)

(73) Assignee: Kindest, Inc., Santa Monica, CA (US)

( * ) Notice: Subject to any disclaimer, the term of this patent is extended or adjusted under 35 U.S.C. 154(b) by 0 days.

(21) Appl. No.: 16/920,222

(22) Filed: Jul. 2, 2020

(65) Prior Publication Data

US 2021/0034693 A1 Feb. 4, 2021

Related U.S. Application Data

(60) Provisional application No. 62/881,866, filed on Aug. 1, 2019.

(51) Int. Cl.
| | |
|---|---|
| *G06F 16/951* | (2019.01) |
| *G06F 16/957* | (2019.01) |
| *G06F 3/0481* | (2013.01) |
| *G06F 16/958* | (2019.01) |
| *G06F 9/54* | (2006.01) |

(52) U.S. Cl.
CPC ...... *G06F 16/9577* (2019.01); *G06F 3/04817* (2013.01); *G06F 9/547* (2013.01); *G06F 16/986* (2019.01)

(58) Field of Classification Search
CPC .. G06F 16/9577; G06F 9/547; G06F 3/04817; G06F 16/986

USPC .......................................................... 715/846
See application file for complete search history.

(56) References Cited

U.S. PATENT DOCUMENTS

| | | | | |
|---|---|---|---|---|
| 7,046,848 | B1* | 5/2006 | Olcott | G06K 9/00442 382/176 |
| 8,595,186 | B1* | 11/2013 | Mandyam | G06F 8/38 707/632 |
| 9,467,515 | B1* | 10/2016 | Penilla | G06F 3/04845 |
| 10,375,060 | B1* | 8/2019 | Graves | G06K 7/1417 |
| 2005/0289072 | A1* | 12/2005 | Sabharwal | G06F 21/121 705/59 |
| 2006/0224951 | A1* | 10/2006 | Burke | G06F 16/957 715/234 |
| 2010/0169832 | A1* | 7/2010 | Chang | G06F 16/954 715/811 |
| 2012/0136756 | A1* | 5/2012 | Jitkoff | G06F 3/04817 705/27.1 |
| 2013/0024364 | A1* | 1/2013 | Shrivastava | G06Q 20/38 705/39 |
| 2013/0151417 | A1* | 6/2013 | Gupta | G06Q 20/382 705/65 |

(Continued)

*Primary Examiner* — Hassan Mrabi
(74) *Attorney, Agent, or Firm* — Perkins Coie LLP; Colin Fowler

(57) ABSTRACT

Disclosed herein are a system and method for generating a floating button widget on a host web site. A popup widget may be generated and appear next to the floating button widget on the host website. The floating button widget is implemented via a code snippet integrated into a source code of the host web site. When the integrated code snippet is executed, an external call to an application programming interface (API) via the Internet is made and subsequently generates the floating button widget and/or popup widget on an interface (i.e., a web page) of the host web site.

16 Claims, 9 Drawing Sheets

(56) References Cited

U.S. PATENT DOCUMENTS

| | | | |
|---|---|---|---|
| 2013/0174012 A1* | 7/2013 | Kwan | G06F 16/958 715/234 |
| 2013/0290203 A1* | 10/2013 | Purves | G06F 16/972 705/319 |
| 2013/0312083 A1* | 11/2013 | Farraro | G06F 3/04845 726/16 |
| 2014/0052617 A1* | 2/2014 | Chawla | G06Q 10/10 705/39 |
| 2014/0189515 A1* | 7/2014 | Waldman | G06F 16/70 715/719 |
| 2014/0304171 A1* | 10/2014 | Mertens | G06Q 20/384 705/71 |
| 2015/0169766 A1* | 6/2015 | Sugihara | G06F 16/951 707/722 |
| 2015/0286829 A1* | 10/2015 | Amacker | G06Q 30/0601 726/27 |
| 2016/0104205 A1* | 4/2016 | Greenberg | G06Q 30/0272 705/14.68 |
| 2016/0188181 A1* | 6/2016 | Smith | G06F 3/04883 715/765 |
| 2016/0232144 A1* | 8/2016 | Zhou | G06F 16/986 |
| 2016/0349960 A1* | 12/2016 | Kumar | G06F 3/04817 |
| 2016/0364771 A1* | 12/2016 | Nielsen | H04L 67/02 |
| 2017/0010765 A1* | 1/2017 | Sankaranarasimhan | G06N 20/00 |
| 2017/0329483 A1* | 11/2017 | Jann | G06F 3/04817 |
| 2017/0330195 A1* | 11/2017 | Lange | G06F 3/0486 |
| 2018/0246983 A1* | 8/2018 | Rathod | G06F 16/9535 |
| 2019/0138166 A1* | 5/2019 | Lemp | G06F 16/954 |
| 2019/0197789 A1* | 6/2019 | MacAuley | G11B 27/00 |
| 2019/0245910 A1* | 8/2019 | Abrahami | H04L 67/02 |
| 2020/0250423 A1* | 8/2020 | Alakkawi | G06K 9/00577 |
| 2020/0257437 A1* | 8/2020 | Fitzpatrick | G06F 3/0486 |
| 2020/0285676 A1* | 9/2020 | Lawson | G06F 16/9577 |
| 2020/0304626 A1* | 9/2020 | Phillips | H04M 1/72544 |
| 2020/0344188 A1* | 10/2020 | Raskin | G06F 3/04847 |

* cited by examiner

SYSTEMS AND METHODS FOR GENERATING FLOATING BUTTON INTERFACES ON A WEB BROWSER

PRIORITY CLAIM

This application claims the benefit of U.S. Provisional Patent Application No. 62/881,866, entitled "A SINGLE LINE OF CODE THAT CAN BE INTEGRATED INTO ANY WEBSITE OR WEBPAGE ENABLING ONLINE DONATIONS TO NPOS AND CHARITABLE CAUSES AND PATRON-TO-PEER GIVING" filed on Aug. 1, 2019, which is incorporated by reference herein in its entirety.

TECHNICAL FIELD

This disclosure relates in general to a system and method for generating a widget.

BACKGROUND

The Internet enables a server computer system to send graphical web pages of information to a remote client computer system. The remote client computer system can display the web pages. Each web page can be uniquely identifiable by a Uniform Resource Locator ("URL"). When the server computer system receives a request specifying the URL for that web page, it sends that web page to the remote client computer system. The remote client computer system typically displays the web page using a browser. Web pages are typically defined using Hyper Text Markup Language ("HTML"), which provide a standard set of tags that define how a web page is to be displayed. When a user indicates to the browser to display a web page, the server computer system receives a request from the browser to transfer an HTML document that defines the web page to the remote client computer system. Upon the remote client computer system receiving the requested HTML document, the browser displays the web page as defined by the HTML document. The HTML document contains tags that control the displaying of text, graphics, and controls. The HTML document may contain tags that control the displaying of a static button (e.g., a clickable button) on the web page.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
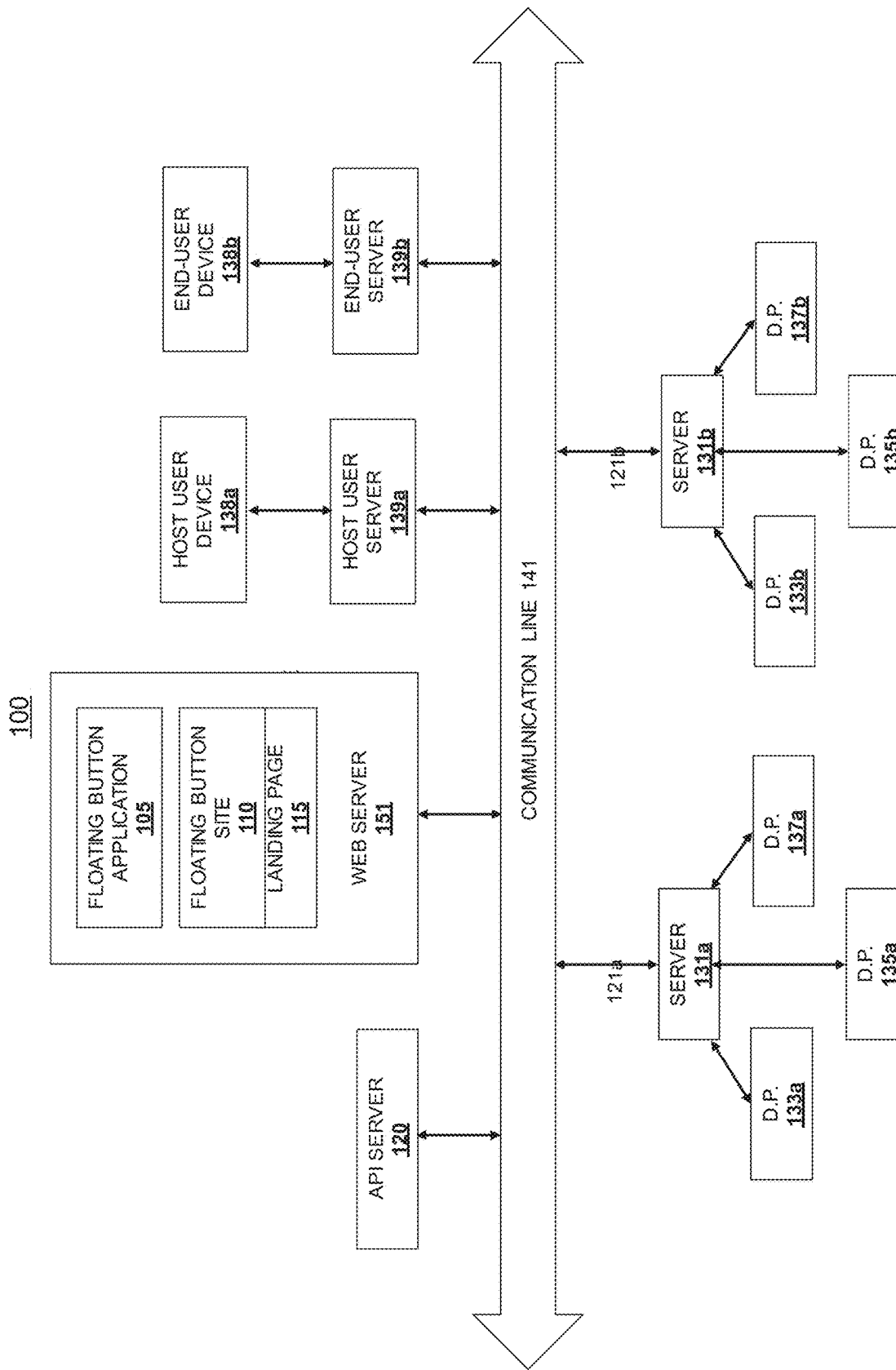
FIG. 1 is a block diagram that illustrates a floating button system 100.

Various embodiments of the present disclosure now will be described more fully with reference to the accompanying drawings. Embodiments of the disclosure may include many different forms and should not be construed as limited to the embodiments set forth herein. These embodiments are intended to convey the scope of the disclosure to those skilled in the art. Furthermore, all "examples" given herein are intended to be non-limiting.

References in this description to "an embodiment," "one embodiment," or the like, mean that the particular feature, function, structure or characteristic being described is included in at least one embodiment of the present invention. Occurrences of Such phrases in this specification do not necessarily all refer to the same embodiment. On the other hand, the embodiments referred to also are not necessarily mutually exclusive.

Components of a floating button system of the present disclosure can be implemented in software, firmware, hardware, or a combination thereof. In one embodiment of the disclosure, which is intended to be a non-limiting example, system components are implemented in software that is executed by a computer, for example, but not limited to, a personal computer, mainframe computer, workstation, etc. A floating button is a web interface button that does not shift around in response to the user shifting the core page (e.g., as with a scroll bar). In some embodiments, a floating button is adjustable independent of the core webpage. A floating button gives the appearance of "floating" over the core webpage. Static or "sticky" headers or footers are structured in the page source code specifically as headers/footers or navbars. The floating button is supplemental to the source, and the source code would function as a legible webpage independent of the floating button.

Floating buttons are distinct from static headers or footers (e.g., that similarly maintain position despite scrolling) in that static headers or footers are part of core structure of a webpage formatting and a floating button is not. Floating buttons are independent from the webpage formatting and structure.

An embodiment of the software-based system, which comprises an ordered listing of executable instructions for implementing logical functions, can be embodied in any computer readable medium for use by, or in connection with, an instruction execution system, apparatus, or device such as a computer-based system, processor-containing system, or other system that can fetch the instructions from the instruction execution system, apparatus, or device and execute the instructions. In the context of this document, a "computer readable medium" can be any means that can contain, store, communicate, or transport the program for use by or in connection with the instruction execution system, apparatus or device. The computer-readable medium can be, for example, but not limited to, an electronic, magnetic, optical, electromagnetic, infrared, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical).

The floating button system allows rapid deployment of a web-based project site for an organization or any group, including an enterprise organization (e.g., a nonprofit organization). Embodiments of the floating button system provide a person (e.g., an administrator) to easily implement a "call to action" floating button interface on a web page. With very little web development skills, administrators of a web site can quickly customize their site to fit the needs of their project, project team, and leadership stakeholders.

In some embodiments, the floating button system of the present disclosure is implemented with use of a communication network, such as the Internet—although a private Intranet may also be used. As such, a brief description and explanation of terms associated with the Internet follow. A browser, or "web" browser, allows for simple graphical user interface (GUI) access to network servers, which support documents formatted as so-called web pages. The web is a collection of servers on the Internet that utilize a Hypertext Transfer Protocol (HTTP), which is an application protocol that provides users access to files (which can be in different formats such as text, graphics, images, sound, video, etc.) using a Standard Generalized Markup Language (SGML). SGML is an information management standard for providing platform-independent and application-independent documents that retain formatting, indexing, and linking information. SGML provides a grammar-like mechanism for users to define the structure of their documents and the tags they will use to denote the structure in individual documents. The page description language known as Hypertext Markup Language (HTML) is an application of SGML. HTML provides basic document formatting of text and images and allows the developer to specify hyperlinks, or "links", to other servers and files.

Use of an HTML-compliant client, such as a web browser, involves specification of an address via a Uniform Resource Locator (URL). Upon such specification, the client makes a TCP/IP request to the server identified in the URL and receives a "web page" (namely, a document formatted according to HTML) in return.

By way of example and illustration, FIG. 1 illustrates an Internet based system upon which one embodiment, among others, of the floating button system 100 of the present disclosure may be implemented. It should be noted that while the present disclosure provides implementation of the floating button system 100 within an Internet based system, the floating button system 100 need not be provided via use of the Internet. Instead, one of reasonable skill in the art will appreciate that the floating button system 100 may be implemented within other mediums, such as, for example, but not limited to, a local area network, or wide area network.

Referring to FIG. 1, a plurality of networks 121a, 121b are shown wherein each network 121a, 121b includes multiple digital processors 133a, 135a, 137a, and 133b, 135b, 137b, respectively. Digital processors 133a, 133b, 135a, 135b, 137a, 137b may include, but are not limited to, personal computers, mini computers, laptops, and the like. Each digital processor 133a, 133b, 135a, 135b, 137a, 137b may be coupled to a host processor or server 131a, 131b for communication among processors 133a, 133b, 135a, 135b, 137a, 137b within the specific corresponding network 121a, 121b.

According to an exemplary embodiment, the host processor or server 131a, 131b is coupled to a communication line 141 that interconnects or links the networks 121a, 121b to each other, thereby forming an Internet. As such, each of the networks 121a, 121b are coupled along the communication line 141 to enable access from a digital processor 133a, 135a, 137a of one network 121a to a digital processor 133b, 135b, 137b of another network 121b. Various user servers, of which a host user server 139a and end-user server 139b are shown as an example, are linked to the communication line 141, thus providing users with access to the Internet. Various user devices, of which a host user device 138a and end-user device 138b are shown as an example, are linked to the host user server 139a and end-user server 139b, respectively. The host user device(s) 138a and end-user device(s) 138b can be, but are not limited to, a server desktop, a desktop computer, a computer cluster, a mobile computing device such as a notebook, a laptop computer, a handheld computer, a mobile phone, a smartphone, a PDA, and/or an iPhone, etc.

According to an exemplary embodiment, a "floating button" web site 110 (and applications provided by the floating button web site 110) and a landing page web site 115 ("landing page 115") may be maintained on a web server 151 that is connected to the Internet for communication among the various networks 121a, 121b and/or digital processors 133a, 133b. 135a, 135b, 137a, 137b, an API server 120 and other users connected to the Internet via respective host user servers 139a and end-user servers 139b. In some embodiments, a "floating button" application 105 is maintained on the web server 151 that builds the floating button web site 110 and the landing page 115 on demand from a user.

The Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

Figure 2:
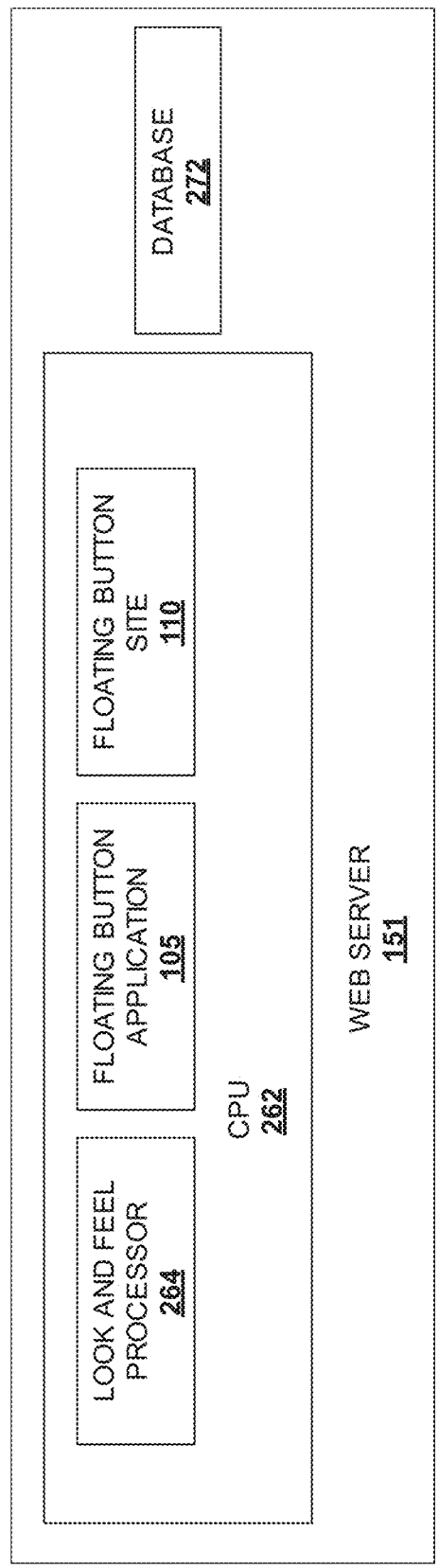
FIG. 2 is a block diagram that further illustrates a web server of FIG. 1

FIG. 2 is a block diagram that further illustrates the web server 151 of FIG. 1. As shown by FIG. 2, the web server 151 comprises a central processing unit (CPU) 262 having a look and feel processor 264 and floating button application 105 for building a floating button system implementing a floating button web site 110. The look and feel processor 264 is capable of performing functionality required by the floating button system 100, as described in detail hereinbelow. The web server 151 also comprises a web server database 272, which holds data necessary to enable the web server 151 to customize a floating button site 110 and landing page 115 in accordance with settings or preferences associated with a particular user (e.g., administrator). It should be noted that other information may be stored within the web server database 272, such as but not limited to information captured by the look and feel processor 264

Figure 3:
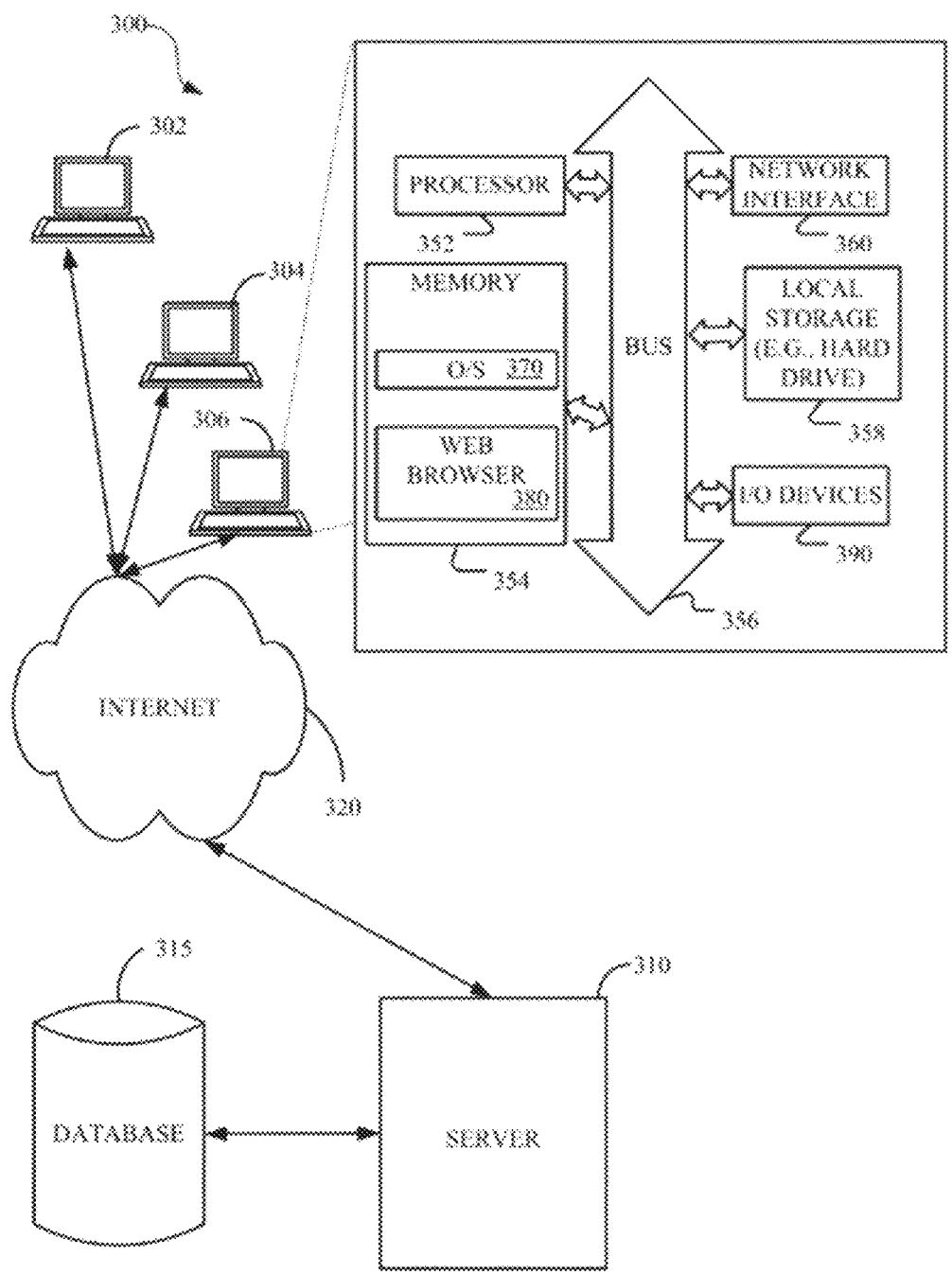
FIG. 3 is a block diagram of one embodiment of a system for accessing floating button web sites from the web server.

FIG. 3 is a block diagram of one embodiment of a system 300 for accessing floating button web sites from the web server 151. As shown in FIG. 3, the system 300 comprises general-purpose computers 302, 304, 306 that are coupled to a server 310 over a network such as the Internet 320. The communication network 320 provides access to Internet services such as email, file transfer proto cols (FTP), WWW, Internet Relay Chat (IRC), etc. and newsgroups, such as Usenet, among others. The server 310 is coupled to a database 315 that stores information. For example, the information may include, but is not limited to, information inputted by a host user and/or end user, design information associated with the floating button site and/or landing page.

In some embodiments, the database 315 stores user data related to an end-user, including the end-user's social network, interactions (e.g., shares, invites, geo-data, ratings, donation history, etc.). The database 315 stores an algorithm for providing recommendations for donations to the end-user (e.g., a donor) based on the user data. User data are encrypted with security protocols (e.g., 3DES, AES, and RSA) to protect such information.

In the operating environment shown in FIG. 3, a user of a general-purpose computer 306 (or other computing device such as a personal digital assistant) attempts to access stored applications on the computer 306 and network services from the network 320. As shown in FIG. 3, the general-purpose computer 306 includes a processor 352, a network interface 360, memory 354, a local storage device 358, and a bus 356 that permits communication between the various components. While not explicitly shown, it should be appreciated that the other computers 302, 304 may also include similar components that facilitate computation or execution of applications on the computers 302, 304. In some embodiments, among others, the local storage device 358 is a hard drive configured to electronically store data. The local storage device 358 may also store computer programs that execute on the computer 306. In this sense, the processor 352 is configured to access any program that is stored on the local storage device 358, and execute the program with the assistance of the memory 354.

The network interface 360 is configured to provide an interface between the general-purpose computer 306 and the network 320. Thus, the network interface 360 provides the interface for the computer 306 to receive any data that may be entering from the network 320 and, also, to transmit any data from the computer 306 to the network 320. Specifically, in some embodiments, the network interface 360 is configured to permit communication between each of the computers 302, 304, 306 and the server 310 and, additionally, to permit communication between the computers 302, 304, 306 themselves. In this regard, the network interface 360 may be a modem, a network card, or any other interface that communicatively couples each of the computers 302, 304, 306 to the network 320. Since various network interfaces are known in the art, further discussion of these components is omitted here.

The memory 354 can include any one or combination of volatile memory elements (e.g., random access memory (RAM, such as DRAM, SRAM, etc.)) and nonvolatile memory elements (e.g., ROM, hard drive, tape, CD ROM, etc.). Moreover, the memory 354 may incorporate electronic, magnetic, optical, and/or other types of storage media. Note that the memory 354 can have a distributed architecture, where various components are situated remote from one another, but can be accessed by the processor 352.

The software in memory 354 may include one or more separate programs, each of which comprises an ordered listing of executable instructions for implementing logical functions. In the example of FIG. 3, the software in the memory 354 includes a web browser application 380 and an operating system (O/S) 370. The operating system 370 controls the execution of other computer programs, and provides scheduling, input-output control, file and data management, memory management, and communication control and related services.

The I/O devices 390 may include input devices, for example but not limited to, a keyboard, mouse, Scanner, digital camera, multi-function device, digital sender, microphone, etc. Furthermore, the I/O devices 390 may also include output devices, for example but not limited to, a printer, display, etc. Finally, the I/O devices 390 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

The software in the memory 354 may further include a basic input output system (BIOS) (omitted for simplicity). The BIOS is a set of software routines that initialize and test hardware at startup, start the O/S 370, and support the transfer of data among the hardware devices. The BIOS is stored in ROM so that the BIOS can be executed when the computer 306 is activated.

When the computer 306 is in operation, the processor 352 is configured to execute software stored within the memory 354, to communicate data to and from the memory 354, and to generally control operations of the computer 306 pursuant to the software. The web browser 380 and the O/S 370, in whole or in part, are read by the processor 352, perhaps buffered within the processor 352, and then executed.

Referring back to FIG. 1, within one embodiment of the floating button system 100, a floating button application 105 is executed by the web server 151. One function of the floating button application 105 is to generate one or more widgets on the floating button web site 110. In some embodiments, another function of the floating button application 105 is to receive information that a user inputs via a browser. In some embodiments, the floating button application 105 generates the one or more widgets on the floating button web site 110 based on the received inputted information. In some embodiments, another function of the floating button application 105 is to generate the landing page 115 based on the received inputted information.

The widget is anything that can be embedded within a page of HTML, i.e. a web page. The widget adds some content to that page that is not static. The widgets can also be referred to as modules, snippets, and plug-ins. The widgets can be written in HTML, but also in JavaScript, Flash, Java, CSS, Python, SQL, PHP, and other programming languages that will be run when the page is called. The widget may include, but is not limited to, a floating button, a popup a lightbox, an alert and/or a web page overlay on a web page.

The widget can be integrated within the floating button web site 110 as browser objects by the placement/integration of a small snippet of code in a source code of the floating button web site 110. When the integrated code snippet is executed, an external call to an application programming interface (API) via the Internet is made and subsequently generates the widget on an interface (i.e., web page) of the floating button web site 110.

Figure 4A:
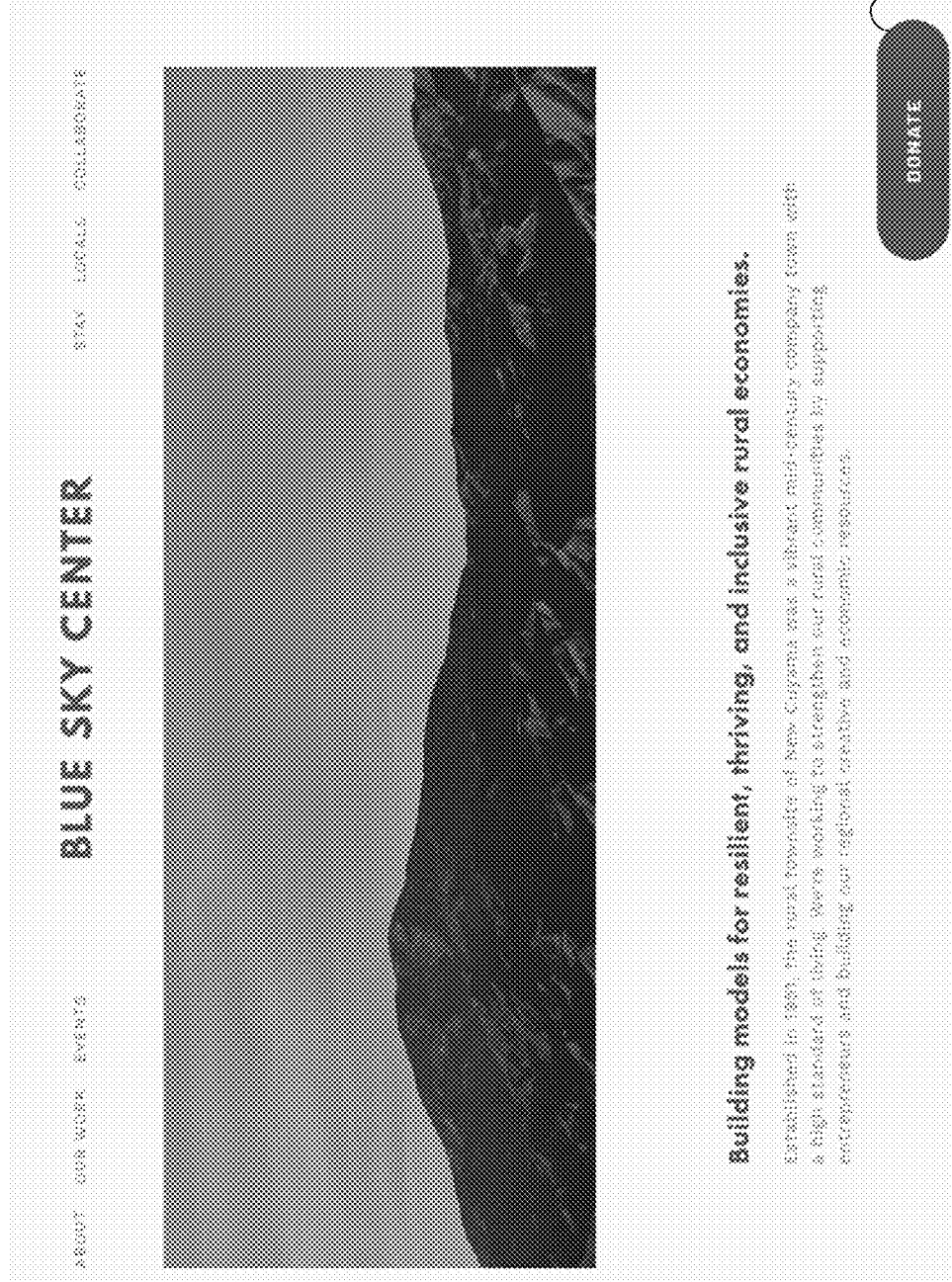
FIGS. 4A and 4B illustrate example interfaces of a floating button widget and a popup widget on a floating button web page.
Figure 4B:

FIGS. 4A and 4B illustrate example interfaces of a floating button widget 410 ("floating button 410") and/or a popup widget 420 ("popup 420") on a floating button web page 430 ("web page 430"). The web page 430 is an interface of the floating button web site 110. The floating button 410 maintains a position within a region on the web page 430 independent from user page scroll commands. In some embodiments, the floating button 410 can be rectangular, circular, oblong, square, and/or any other suitable shape. In some embodiments, the floating button 410 includes transparent portions and/or non-transparent portions.

The floating button 410 may include a call to action message. For example, the call to action message may include, but not limited to, "DONATE" (as shown in FIGS. 4A and 4B), "VOLUNTEER," "GIVE," and/or "CONTRIBUTE." The floating button 410 enables the collection of one-time and/or recurring donations from an end-user (e.g., a donor) via the floating button web site 110, such as for a non-profit organization (NPO) and a donation campaign.

The popup 420 may be a lightbox overlayed on top of a portion of the web page 430. The popup 420 maintains a position on web page 430 independent from user page scroll commands. The popup 420 can be rectangular, circular, oblong, square, and/or any other suitable shape. In some embodiments, the popup 420 includes transparent portions and/or non-transparent portions. The popup 420 may include content, such as a message. For example, the message may provide an overview and/or a highlight about an NPO's campaign. The popup 420 allows an administrator of the floating button website 110 to easily modify the content displayed on the web page 430.

Figure 5:
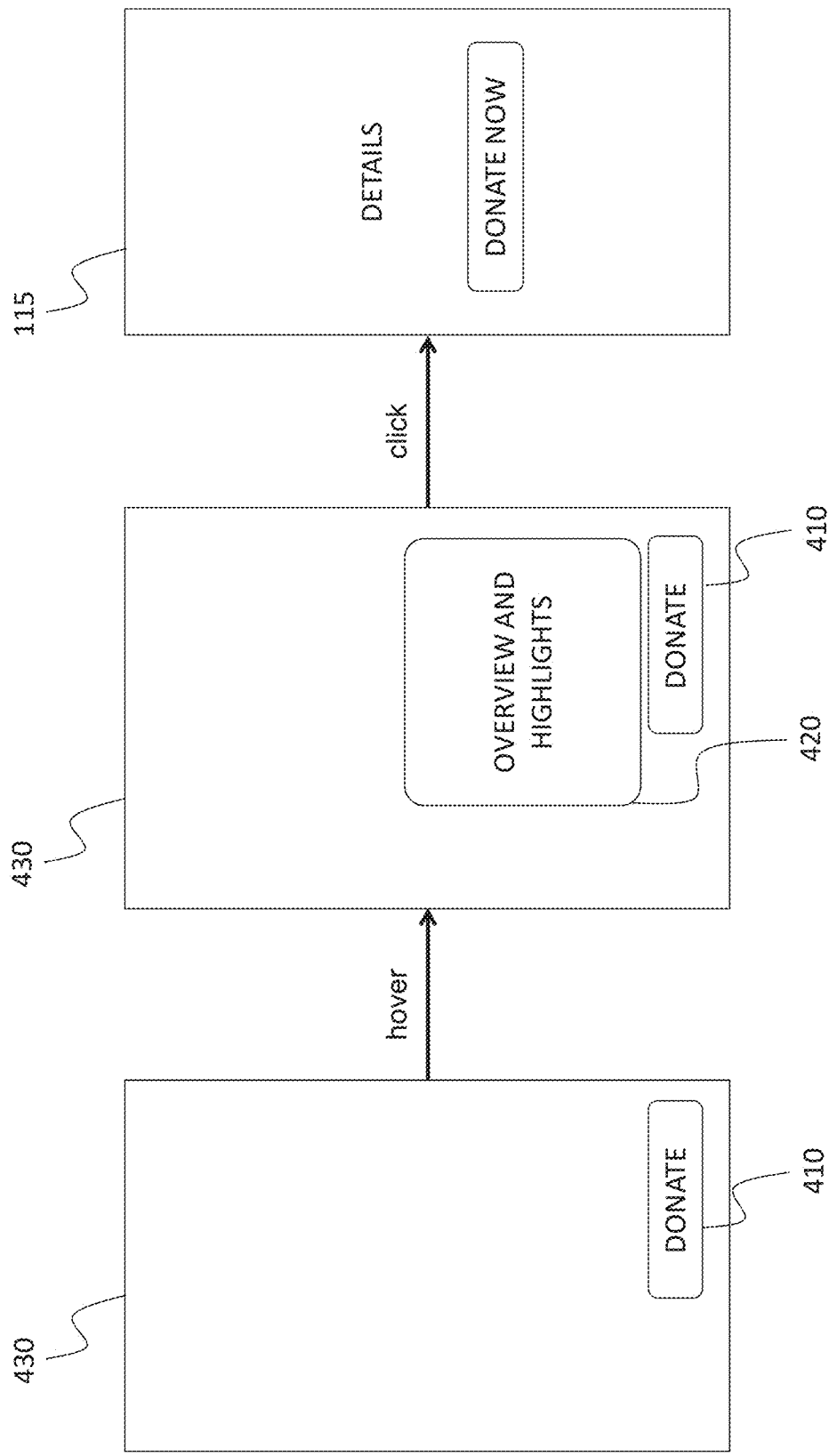
FIG. 5 illustrates a process by the popup widget and a landing page are invoked via activation of the floating button widget.

Referring to FIG. 5, the popup 420 may be invoked when the floating button 410 is selected. For example, an end-user may select the floating button 410 by "hovering" a cursor arrowhead above the floating button 410. Hovering includes placing a cursor within a portion of the floating button 410 on a browser for a specified duration. For example, the specified duration can be 0.1 seconds, 0.5 seconds, 1 second, 2 seconds, 3 seconds, and/or any suitable amount of time. In a further example, the end-user interfacing the web page 430 on a smartphone may double tap a portion of the floating button 410. The popup 420 may be displayed proximate to the floating button 410 on the web page 430. For example, the web server 151 may display the popup 420 vertically above the floating button 410. In other embodiments, the popup 420 may be displayed on the web page 430 without the need to be invoked by a user selection. For example, the popup 420 is displayed when the web page 430 is loaded onto the user's browser.

An end-user (e.g., a donor) may be presented the landing page 115 upon activating the floating button 410 or popup 420. For example, the end-user may activate the floating button 410 or popup 420 by placing a cursor within a portion of the floating button 410 or popup 420 and clicking. In a further example, the end-user interfacing the web page 430 on a smartphone may single tap a portion of the floating button 410 or popup 420. The landing page 115 may be loaded onto a new browser window and/or browser tab. For example, the landing page 115 may be retrieved from the web server 151.

In some embodiments, a source code of the landing page may be substantially different than the source code of the floating button web site.

The landing page 115 displays information received from a host user (e.g., an administrator of the landing page 115). For example, for a NPO's campaign, the landing page 115 may display campaign information including, but not limited to, details about an "ask" (a financial goal of the NPO's campaign), one or more goals (a target amount of money the NPO aims to raise for the campaign), a number of fundraising goals (e.g., one, two, three, four, etc.), a progress bar for each fundraising goal, and a description of each goal (e.g., explanation of what and how much can be accomplished for the NPO's campaign upon meeting goal). The floating button application 105 may receive information (e.g., campaign information) from the host user via an interface (e.g., web page) of the floating button application 105. The floating button application 105 generates the landing page 115 to contain the information received from the host user.

The floating button application 105 receives design information and generates the landing page 115 styled according to the design information. Design information received may include criteria for the design of the landing page 115. The design criteria may include visually perceptible assets. Visually perceptible assets may include, but are not limited to, text, colors and fonts of text and backgrounds, logos, images, media that is to be rendered in the final presentation to an end-user by way of a rendering and/or layout engine running on a computing device of the user device, layout, typographic and color scheme, banners, motifs, and other design assets of a website.

In some embodiments, the floating button application 105 receives design information from the host user. For example, the host user may input selections for each visually perceptible asset via an interface of the floating button application 105. For example, the host user may individually indicate a layout, typographic and/or color scheme. In a further example, the host user may upload a logo of the host user's company/organization.

In some embodiments, the floating button application 105 includes a preset selection of visually perceptible assets. For example, the floating button application 105 may generate a preset selection of visually perceptible assets, including a preset layout, typographic and/or color scheme. The floating button application 105 generates the landing page 115 based on the preset selection.

In some embodiments, the floating button application 105 generates the landing page 115 based on a combination of the information received from the host user and the preset selection.

In some embodiments, visually perceptible assets are extracted from the host user's floating button web site 110 and incorporated into the landing page 115. Extracted visually perceptible assets are also referred to hereinbelow as "look and feel elements." Look and feel elements include, but are not limited to, logos, colors, page layout, navigation systems, frames, mouse-over effects, or other elements that are consistent through some or all of the host web site. This enables capturing and storing the look at feel of the host user's floating button web site 110 on the landing page 115. For example, when an end-user (e.g., a donor) clicks on the floating button 410 and is served the landing page 115, the landing page 115 should retain the host user's floating button web site 110.

In some embodiments, a system for extracting, storing, and implementing the look and feel of the host user's floating button web site 110 on the landing page 115 includes the look and feel processor 264, floating button application 105, database 272, and communication line 141. The look and feel processor 264 captures the look and feel elements. The database 272 stores the look and feel elements. The communication line 141 connects the database 272 to the host user's floating button site 110 whose look and feel is to be captured.

In some embodiments, the look and feel of a host web site (e.g., the host user's floating button web site 110) is captured and stored by receiving an identification of an example page of a target host web site. For example, the host user provides the URL of the web page of which the look and feel is to be replicated. The identified page is retrieved by the look and feel processor 264. Look and feel elements of the page are identified/captured. These elements are stored in the database 272 for future use in generating outsourced transparent pages (e.g., landing pages 115). Such pages give the viewer of the page the impression that she is viewing pages served by the host web site. This is accomplished by capturing the HTML text and images that comprise their look and feel and embed within it the landing page HTML content. Any relative URLs in the host web site's look and feel may be changed to absolute URLs back to the host web site.

In some embodiments, the look and feel elements of a target web page are identified using natural language processing (NLP). For example, the look and feel processor 264 uses NLP to identify meaning of titles and/or metadata associated with the look and feel elements. The title and/or metadata is used by the NLP to predict what the look and feel element is. For example, the title and/or metadata may include HTML tags of the target web page. Based on that prediction, the extraction processor decides whether the look and feel element is worth extracting. If extracted, the look and feel processor 264 decides where to place the look and feel element based on what the title and/or metadata.

In some embodiments, the look and feel elements of a target web page are identified using a heuristic. For example, an end-user can program a heuristic to identify meaning of titles and/or metadata associated with the look and feel elements. The title and/or metadata (e.g., HTML tags) is used by the heuristic to predict what the look and feel element is. A machine learning model makes the decision based on training data. For example, the model is shown a training data set. For example, the training data set can include, but is not limited to, a banner image file. In a further example, the banner image file includes a number of characteristics (e.g., size, name, position on page, metadata, etc.). The machine learning model then has a number of example banner images to compare to and identifies, based on the example banner images, the current file. For example, the number of example banner images can be 1 million, 2 million, and/or any suitable number.

In some embodiments, the floating button application 105 includes one or more donation features. The donation features include, but are not limited to, multiple goal setting, donation tiers, patron-to-peer giving, a digital community, and/or a messaging platform (e.g., users can leave positive messages in real-time).

In some embodiments, the donation tier feature displays information on the landing page 115 including, but not limited to, details on how the NPO benefits from each donation. Each donation tier contains a predetermined donation amount, a description outlining how the NPO intends to use the funds, and/or a donation frequency (e.g., a frequency that a donor donates to the NPOs and/or the NPOs campaign). For example, the donation frequency can be one-time and/or recurring (e.g., weekly, monthly, bi-monthly, and annually). The donor and/or the NPO can set the donation frequency.

In some embodiments, for the patron-to-peer giving feature, the floating button application 105 system generates a unique link associated with each unique donor. For example, the floating button application 105 generates a first link (e.g., a URL and QR code) for a first donor and a second link for a second donor. The donor may share their unique link to promote raising money for a campaign. A portion/section of the campaign's landing page may feature the donor. For example, the landing page 115 may display information related to the donor's identity (e.g., a name, photo, and profile description) and an amount raised through the donor. In some embodiments, the unique link associated with the unique donor is associated with a unique landing page. The unique link allows NPOs to effectively share their campaign. The unique link can be easily shared on platforms such as social media, newsletters (printed and/or digital), email, SMS text, and/or any other suitable messaging service.

In some embodiments, an end-user (e.g., a patron) of the end-user device 138b can be connected to another user (e.g., a peer) of another end-user device 138b via social networks including, but not limited to, Facebook, Instagram, TikTok, etc., an address book of the end user devices 138b, and/or any other suitable means of connecting two users.

In some embodiments, the floating button system 100 integrates a payment system. For example, the floating button system 100 can integrate a third-party software (e.g., PayPal, Visa, IBM, Square, etc.) and/or an API from API server 120. An exemplary benefit of the floating button system 100 is promoting accessibility of implementing a web-based donation feature, as a host user (e.g., an administrator of an NPO) needs to insert one or few code snippets to generate a floating button widget with a donation feature.

In some embodiments, a unique receipt (e.g., a tax receipt) is generated and delivered to the donor at the completion of each donation transaction. The unique receipt may be delivered digitally, such as via email, text, and/or any other suitable methods. The unique receipt may be delivered via traditional means, such as mail.

Figure 6:
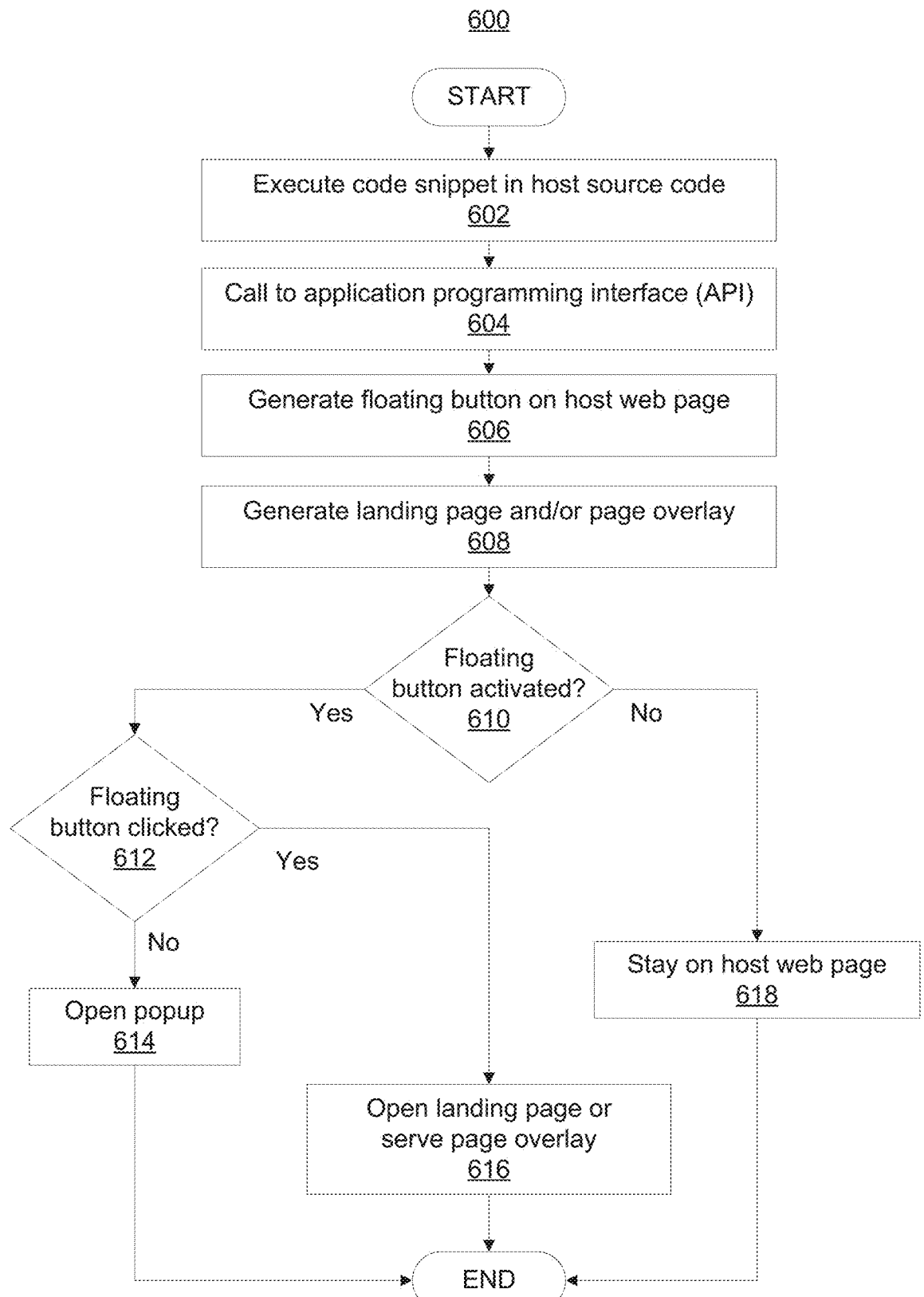
FIG. 6 is flowchart illustrating a process of executing a floating button application.

FIG. 6 is flowchart illustrating a process 600 of executing a floating button application. In step 602, a web server executes a code snippet that is integrated into a source code of a host web site (i.e., a floating button web site). The code snippet is configured to execute an external call to an API via the Internet. In some embodiments, the code snippet is configured to generate a region for applying graphics. In step 604, the web server executes the external call to the API. In step 606, the external call to the API modifies a host web page of the host web site and generates a floating button widget ("floating button") on an interface of the host web page. Information called by selecting the floating button is not included in the host source code. In step 608, the web server generates a landing page. In some embodiments, the web server generates a page overlay.

Continuing with FIG. 6, in decision block 610, the web server detects if the floating button is activated. Activating the floating button includes placing a cursor arrowhead over the floating button. If the web server detects the cursor arrowhead over the floating button, the process proceeds to decision block 612.

Continuing with FIG. 6, in decision block 612, the web server detects if the floating button is activated. Activating the floating button includes placing a cursor arrowhead over the floating button. If the web server detects a cursor arrowhead over the floating button, the process proceeds to decision block 614.

Continuing with FIG. 6, in decision block 612, the web server detects if the floating button is clicked. If the web server detects the cursor arrowhead over the floating button but the floating button is not clicked (i.e., the cursor arrowhead is hovering over the floating button), the process proceeds to step 614. In some embodiments, if the web server detects a tapping of the floating button, the process 600 proceeds to step 614. For example, on a smartphone and/or tablet, an end-user may double tap the floating button, which is equivalent to hovering a cursor arrowhead over the floating button on a computer web browser. In step 614, the web server displays a popup widget on an interface of the host web page.

Continuing with FIG. 6, if the web server detects a cursor arrowhead over the floating button and the floating button is clicked, the process 600 proceeds to step 616. In step 616, the web server opens a landing page. For example, the web server opens the landing page in a new web browser window. In some embodiments, the web server redirects to the landing page. For example, the web server opens the landing page on the same web browser window, replacing the current host web page. In some embodiments, the web server displays the page overlay over the current host web page.

Continuing with FIG. 6, at decision block 610, if the web server does not detect the activation of the floating button, the process proceeds to step 618. In step 618, the web server remains on the current host web page.

Figure 7:
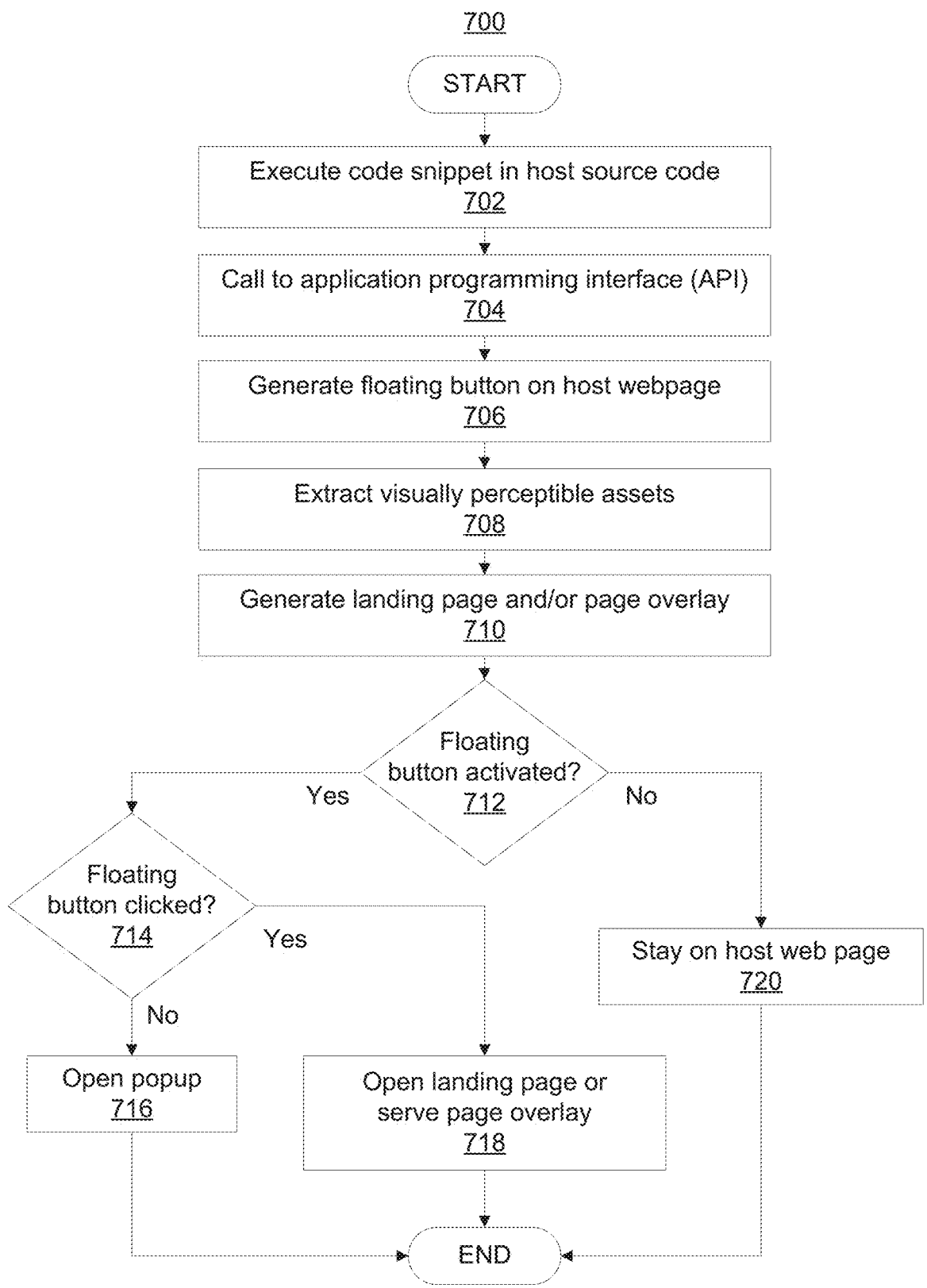
FIG. 7 is a flowchart illustrating another process of executing a floating button application.

FIG. 7 is a flowchart illustrating a process 700 of executing a floating button application. In step 702, a web server executes a code snippet that is integrated into a source code of a host web site (i.e., a floating button web site). The code snippet is configured to execute an external call to an API via the Internet. In some embodiments, the code snippet is configured to generate a region for applying graphics. In step 704, the web server executes the external call to the API. In step 706, the external call to the API modifies a host web page of the host web site and generates a floating button widget ("floating button") on an interface of the host web page. Information called by selecting the floating button is not included in the host source code.

Continuing with FIG. 7, in step 708, the floating button application extracts visually perceptible assets (i.e., look and feel elements) from one or more host web pages of the host web site. In step 710, the web server generates a landing page having a look and feel of the host web site by including the extracted visually perceptible assets from the host web site. In some embodiments, the web server generates a page overlay having a look and feel of the host web site by including the extracted visually perceptible assets from the host web site.

Continuing with FIG. 7, in decision block 712, the web server detects if the floating button is activated. Activating the floating button includes placing a cursor arrowhead over the floating button. If the web server detects a cursor arrowhead over the floating button, the process 700 proceeds to decision block 714.

Continuing with FIG. 7, in decision block 714, the web server detects if the floating button is clicked. If the web server detects the cursor arrowhead over the floating button but the floating button is not clicked (i.e., the cursor arrowhead is hovering over the floating button), the process proceeds to step 716. In some embodiments, if the web server detects a tapping of the floating button, the process proceeds to step 716. For example, on a smartphone and/or tablet, an end-user may double tap the floating button, which is equivalent to hovering a cursor arrowhead over the floating button on a computer web browser. In step 716, the web server displays a popup widget on an interface of the host web page.

Continuing with FIG. 7, if the web server detects the cursor arrowhead over the floating button and the floating button is clicked, the process 700 proceeds to step 718. In step 718, the web server opens a landing page with the look and feel of the host web page. For example, the web server opens the landing page in a new web browser window. In some embodiments, the web server redirects to the landing page with the look and feel of the host web page. For example, the web server opens the landing page on the same web browser window, replacing the current host web page. In some embodiments, the web server displays the page overlay having the look and feel of the host web page over the current host web page.

Continuing with FIG. 7, at decision block 712, if the web server does not detect the activation of the floating button, the process 700 proceeds to step 720. In step 720, the web server remains on the host webpage.

Figure 8:
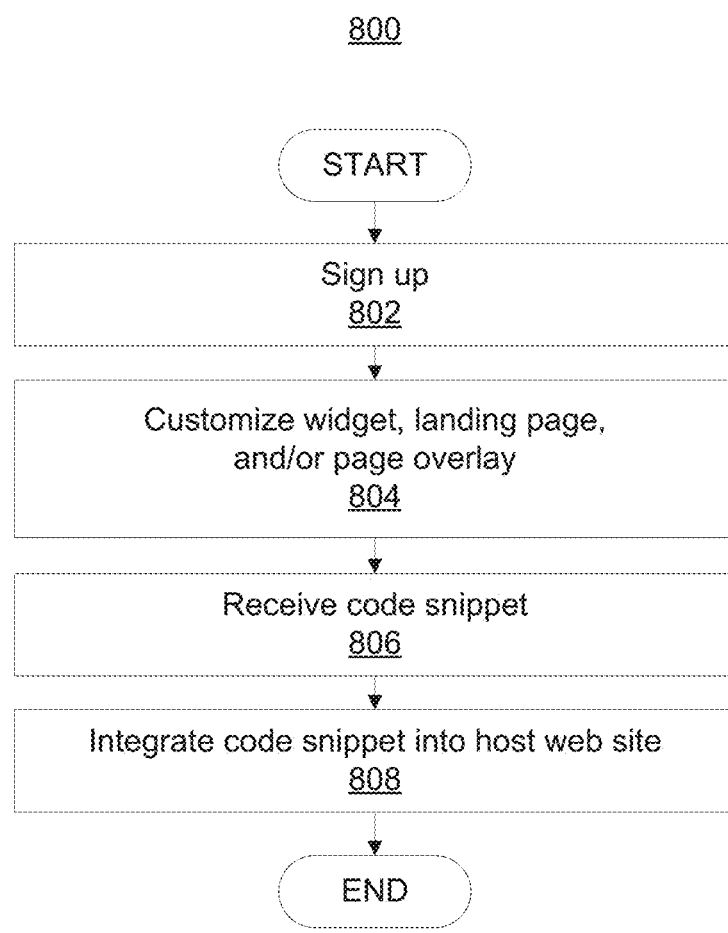
FIG. 8 is a flowchart illustrating a process 800 by which a host user interacts with a floating button system.

FIG. 8 is a flowchart illustrating a process 800 by which a host user interacts with a floating button system. For example, the host user can be an administrator of a host web site for an NPO. In step 802, the host user signs up to integrate the floating button system on a host web site. For example, the host user can sign up via a web browser.

Continuing with FIG. 8, in step 804, the host user customizes a widget (e.g., a floating button widget and popup widget). In some embodiments, the host user customizes a landing page. In some embodiments, the host user customizes a page overlay. In some embodiments, the host user selects whether to include the floating button widget, popup widget, landing page, and/or page overlay. The host user provides details to a floating button application for displaying on the widget, landing page, and/or page overlay. For example, the administrator of the NPO may provide details about the NPO's campaign (e.g., a donation ask and goal).

Continuing with step 804 of FIG. 8, in some embodiments, the host user may input selections for visually perceptible assets. For example, the host user may select a color and typographic scheme and upload a logo and images. In some embodiments, the host user may select a preset selection of visually perceptible assets. In some embodiments, the host user may select to have the visually perceptible assets extracted from the host web site.

Continuing with FIG. 8, in step 806, the host user receives a code snippet generated by the floating button system. In step 808, the host user integrates the code snippet into a source code of the host web site.

Current solutions for online transactions and donations are expensive and time consuming to implement and are ineffective at promoting recurring donations. For example, many charities and NPOs do not have the technical expertise necessary to accept and process donations online. Implementing a solution to process donations online typically requires creating a custom website with a secure payment checkout system that reliably and safely processes end-user donations. Creating the custom web site can be expensive and time consuming, generally requiring designers to lay out the web site, coders to develop the web site, and implementing a solution for accepting and processing transactions. Solutions that enable the ability to process a transaction via implementation of a short code snippet into a host web site do not have a donation component that provides highlights of an ask. These solutions are purely transactional. Consequently, many charities may miss out on web-based/online donations. Further, NPOs seeking online donations may rely on crowdfunding web sites. However, these crowdfunding web sites can take a significant percentage of the donations processed and are ineffective for ongoing or recurring donations. In addition, crowdfunding web sites drive a donor away from the NPO's web site and onto the crowdfunding web site where the donor may be lost or distracted by another need.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 400 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or nonvolatile memory. In some embodiments, the volatile memory may be considered "non-transitory" in the sense that it is not a transitory signal. Memory space and storages described in the figures can be implemented with the tangible storage memory as well, including volatile or nonvolatile memory.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense.

I claim:

1. A method comprising:
   executing a floating button application via a code snippet integrated into a host source code of a host web page, wherein the code snippet is configured to execute an external call to an application programming interface (API) into the host web page via the Internet;
   in response to said executing the floating button application via the code snippet, generating a floating button widget on an interface of the host web page, wherein the host web page is an existing third-party host web page, and wherein information called by selecting the floating button widget is not included in the host source code and the floating button widget maintains a position on the interface of the host web page independent from user page scroll commands;
   extracting visually perceptible assets from the host web page, wherein extracting the visually perceptible assets includes evaluating asset titles and/or asset positions of assets on the host web page, and wherein the visually perceptible assets are located on the host web page and primarily form a look and feel of the host web page;
   generating a second webpage or a web page overlay having the look and feel of the host web page via inclusion of the visually perceptible assets from the host web page; and
   upon receiving an indication that the floating button widget has been activated by a user of the host web page, serving the second web page or web page overlay to the user.

2. The method of claim 1, further comprising opening a popup widget on the host web page in response to received input that a user cursor is hovering over the floating button.

3. The method of claim 1, wherein the code snippet is configured to generate a region for applying graphics.

4. The method of claim 3, wherein the region is rectangular.

5. The method of claim 3, wherein the region includes transparent portions.

6. The method of claim 1, wherein extracting the visually perceptible assets is performed by natural language processing.

7. The method of claim 1, wherein extracting the visually perceptible assets is performed by a heuristic.

8. The method of claim 1, further comprising storing the extracted the visually perceptible assets in a database.

9. A system comprising:
   a floating button application that:
   executes a code snippet integrated into a host source code of a host web page,
   executes an external call to an application programming interface (API) into the host web page via the Internet,
   generates a floating button widget on an interface of the host web page, and
   generates a second web page or a web page overlay having a look and feel of the host web page via inclusion of visually perceptible assets extracted from the host web page, wherein the visually perceptible assets are located on the host web page and primarily form a look and feel of the host web page,
   wherein information called by selecting the floating button widget is not included in the host source code and the floating button widget maintains a position on the interface of the host web page independent from user page scroll commands;
   an API server that receives the external call to the API;
   a database;
   a host user device;
   an end-user device;
   a web server that receives an indication that the floating button widget has been activated by a user of the host web page and serves the second web page or web page overlay to the end-user device, wherein the second web page or web page overlay has the look and feel of the host web page via inclusion of the visually perceptible assets from the host web page; and
   a communication line that connects the floating button application, the API server, a look and feel processor, the database, the host user device, the end-user device, and the web server.

10. The system of claim 9, wherein the floating button application receives information from a user via a web browser.

11. The system of claim 10, wherein the database stores the received information from the user.

12. The system of claim 9, wherein the floating button application generates a popup widget.

13. The system of claim 12, wherein the web browser opens the popup widget on the host web page in response to received input that a user cursor is hovering over the floating button.

14. A system comprising:
a floating button application that:
executes a code snippet integrated into a host source code of a host web page,
executes an external call to an application programming interface (API) into the host web page via the Internet,
generates a floating button widget on an interface of the host web page, and
generates a second web page or a web page overlay having a look and feel of the host web page via inclusion of visually perceptible assets extracted from the host web page,
wherein information called by selecting the floating button widget is not included in the host source code and the floating button widget maintains a position on the interface of the host web page independent from user page scroll commands;
an API server that receives the external call to the API;
a look and feel processor that performs the extraction of the visually perceptible assets from the host web page by evaluating asset titles and/or asset positions of assets on the host web page, wherein the visually perceptible assets are located on the host web page and primarily form a look and feel of the host web page;
a database that stores the visually perceptible assets;
a host user device;
an end-user device;
a web server that receives an indication that the floating button widget has been activated by a user of the host web page and serves the second web page or web page overlay to the end-user device, wherein the second webpage or web page overlay has the look and feel of the host web page via inclusion of the visually perceptible assets from the host web page; and
a communication line that connects the floating button application, API server, look and feel processor, database, host user device, end-user device, and web server.

15. The system of claim 14, wherein the look and feel processor uses natural language processing (NLP).

16. The system of claim 14, wherein the look and feel processor uses a heuristic.

* * * * *